US011942296B2

(12) United States Patent
Geng et al.

(10) Patent No.: US 11,942,296 B2
(45) Date of Patent: Mar. 26, 2024

(54) CONTACTOR

(71) Applicants: TE Connectivity Services GmbH, Schaffhausen (CH); TE CONNECTIVITY BRASIL INDUSTRIA DE ELECTRONICOS LTDA, Braganca Paulista (BR)

(72) Inventors: Xiaobao Geng, Troy, MI (US); Amadeu Luiz Fazani Cavallieri, Sao Paulo (BR)

(73) Assignees: TE Connectivity Brasil Industria De Electronicos LTDA (BR); TE Connectivity Solutions GmbH (CH)

( * ) Notice: Subject to any disclaimer, the term of this patent is extended or adjusted under 35 U.S.C. 154(b) by 0 days.

(21) Appl. No.: 17/717,617

(22) Filed: Apr. 11, 2022

(65) Prior Publication Data

US 2023/0076921 A1 Mar. 9, 2023

Related U.S. Application Data

(60) Provisional application No. 63/240,756, filed on Sep. 3, 2021.

(51) Int. Cl.
*H01H 50/54* (2006.01)
*H01H 1/54* (2006.01)
*H01H 50/02* (2006.01)
*H01H 50/44* (2006.01)

(52) U.S. Cl.
CPC .............. *H01H 50/54* (2013.01); *H01H 1/54* (2013.01); *H01H 50/02* (2013.01); *H01H 50/44* (2013.01)

(58) Field of Classification Search
CPC ........................................................ H01H 1/54
USPC ........................................... 335/16, 147, 195
See application file for complete search history.

(56) References Cited

U.S. PATENT DOCUMENTS

| | | | | |
|---|---|---|---|---|
| 3,887,888 A * | 6/1975 | Bayles | H01H 1/50 335/16 |
| 3,991,290 A * | 11/1976 | Bayles | H01H 1/54 200/250 |
| 8,138,872 B2 * | 3/2012 | Yoshihara | H01F 7/1615 335/185 |
| 11,694,856 B2 * | 7/2023 | Niu | H01H 1/5822 335/16 |
| 2013/0335175 A1 | 12/2013 | Tachikawa et al. | |

(Continued)

FOREIGN PATENT DOCUMENTS

FR 2570869 A1 3/1986

OTHER PUBLICATIONS

International Search Report, International App. No PCT/IB2022/058266 International Filing Date Sep. 2, 2022.

*Primary Examiner* — Alexander Talpalatski

(57) ABSTRACT

A contactor includes first and second fixed contacts coupled to a housing having mating ends located in the cavity. The contactor includes a movable contact movable within the cavity between a mated position and an unmated position. The movable contact engages the second mating end in the mated position and is separated from the second fixed contact in the unmated position. The contactor includes a coil assembly in the cavity operated to move the movable contact. The contactor includes a magnetic shroud coupled to at least one of the movable contact and the second fixed contact to provide a magnetic holding force to hold the movable contact relative to the second fixed contact in the mated position.

20 Claims, 7 Drawing Sheets

(56) References Cited

U.S. PATENT DOCUMENTS

| | | | | |
|---|---|---|---|---|
| 2013/0335177 | A1 | 12/2013 | Enomoto | |
| 2014/0002215 | A1* | 1/2014 | Ionescu | H01H 50/18<br>335/18 |

* cited by examiner

CONTACTOR

CROSS REFERENCE TO RELATED APPLICATIONS

This application claims benefit to U.S. Provisional Application No. 63/240,756, filed 3 Sep. 2021, titled “Magnetic Clamp for Contactor Terminals”, the subject matter of which is herein incorporated by reference in its entirety.

BACKGROUND OF THE INVENTION

The subject matter herein relates generally to high power electrical contactors.

Certain electrical applications, such as HVAC, power supply, locomotives, elevator control, motor control, aerospace applications, hybrid electric vehicles, fuel-cell vehicles, charging systems, and the like, utilize electrical contactors having contacts that are normally open (or separated). The contacts are closed (or joined) to supply power to a particular device. When the contactor receives an electrical signal, the contactor is energized to introduce a magnetic field to drive a movable contact to mate with fixed contacts. During mating and unmating of the movable contact with the fixed contacts, electrical arcing may occur, which may cause damage to the contacts, such as oxidation of the surfaces of the contacts, leading to failure of the contactor over time. Additionally, contact resistance is high at the interfaces between the fixed contacts and the movable contact. In some high power applications, magnetic forces may cause the movable contact to tend to separate from the fixed contacts, leading to arcing which can damage the contacts and may lead to vibration and noise that is undesirable.

A need exists for a contactor that overcomes the above problems and addresses other concerns experienced in the prior art.

BRIEF DESCRIPTION OF THE INVENTION

In one embodiment, a contactor is provided and includes a housing having an outer wall defining a cavity. The contactor includes a first fixed contact coupled to the housing. The first fixed contact has a first mating end located in the cavity. The contactor includes a second fixed contact coupled to the housing. The second fixed contact has a second mating end located in the cavity. The contactor includes a movable contact movable within the cavity between a mated position and an unmated position. The movable contact engages the second mating end in the mated position. The movable contact is separated from the second fixed contact in the unmated position. The contactor includes a coil assembly in the cavity operated to move the movable contact between the unmated position and the mating position. The contactor includes a magnetic shroud coupled to at least one of the movable contact and the second fixed contact to provide a magnetic holding force to hold the movable contact relative to the second fixed contact in the mated position.

In another embodiment, a contactor is provided and includes a housing having an outer wall defining a cavity. The contactor includes a first fixed contact coupled to the housing. The first fixed contact has a first mating end received in the cavity and a first terminating end outside of the housing. The contactor includes a second fixed contact coupled to the housing. The second fixed contact has a second mating end received in the cavity and a second terminating end outside of the housing. The contactor includes a movable contact movable within the cavity between a mated position and an unmated position. The movable contact engages the second mating end in the mated position. The movable contact is separated from the second fixed contact in the unmated position. The contactor includes a flexible busbar coupled to the first mating end and coupled to the movable contact. The flexible busbar electrically connects the first fixed contact and the movable contact in both the mated position and the unmated position. The contactor includes a magnetic shroud coupled to at least one of the movable contact and the second fixed contact to provide a magnetic holding force to hold the movable contact relative to the second fixed contact in the mated position.

In a further embodiment, a contactor is provided and includes a housing having an outer wall defining a cavity. The contactor includes a first fixed contact coupled to the housing. The first fixed contact has a first mating end received in the cavity and a first terminating end outside of the housing. The contactor includes a second fixed contact coupled to the housing. The second fixed contact has a second mating end received in the cavity and a second terminating end outside of the housing. The contactor includes a movable contact assembly received in the cavity. The movable contact assembly includes a flexible busbar, a movable contact, and a movable contact holder. The flexible busbar coupled to the first mating end and coupled to the movable contact. The movable contact held by the movable contact holder. The movable contact holder and the movable contact movable within the cavity between a mated position and an unmated position. The movable contact engages the second mating end in the mated position. The movable contact is separated from the second fixed contact in the unmated position. The flexible busbar electrically connects the first fixed contact and the movable contact in both the mated position and the unmated position. The contactor includes a magnetic shroud including an upper shroud coupled to the movable contact and a lower shroud coupled to the second fixed contact. The magnetic shroud includes a magnetic holding force between the upper shroud and the lower shroud to hold the movable contact relative to the second fixed contact in the mated position.

DETAILED DESCRIPTION OF THE INVENTION

Figure 1:
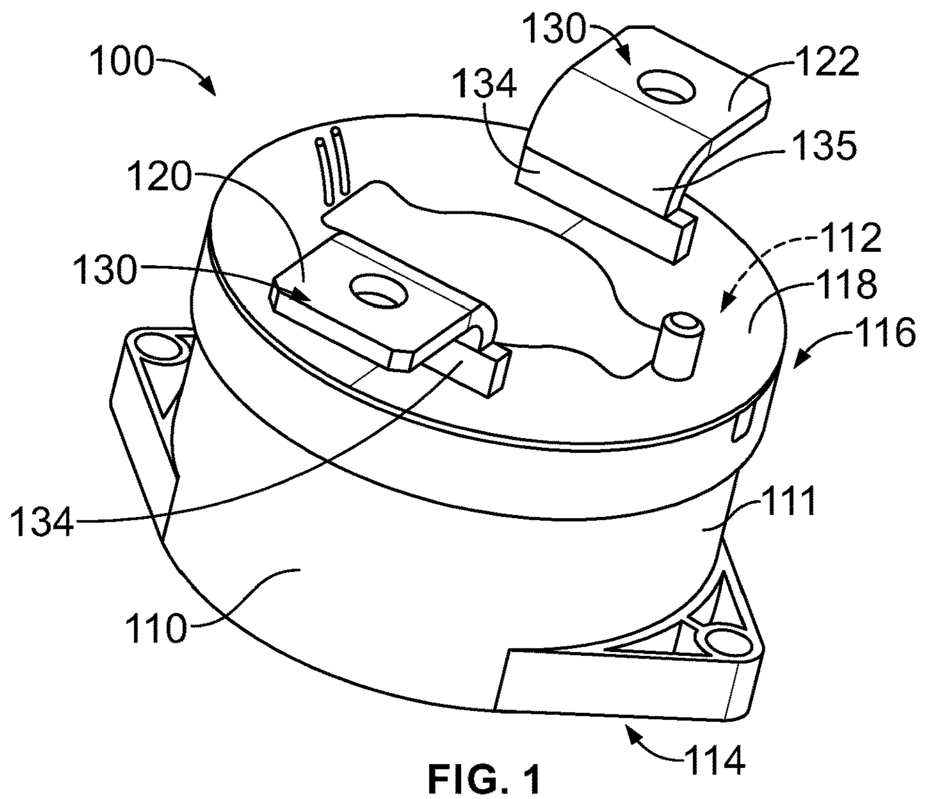
FIG. 1 illustrates a contactor in accordance with an exemplary embodiment.
Figure 2:
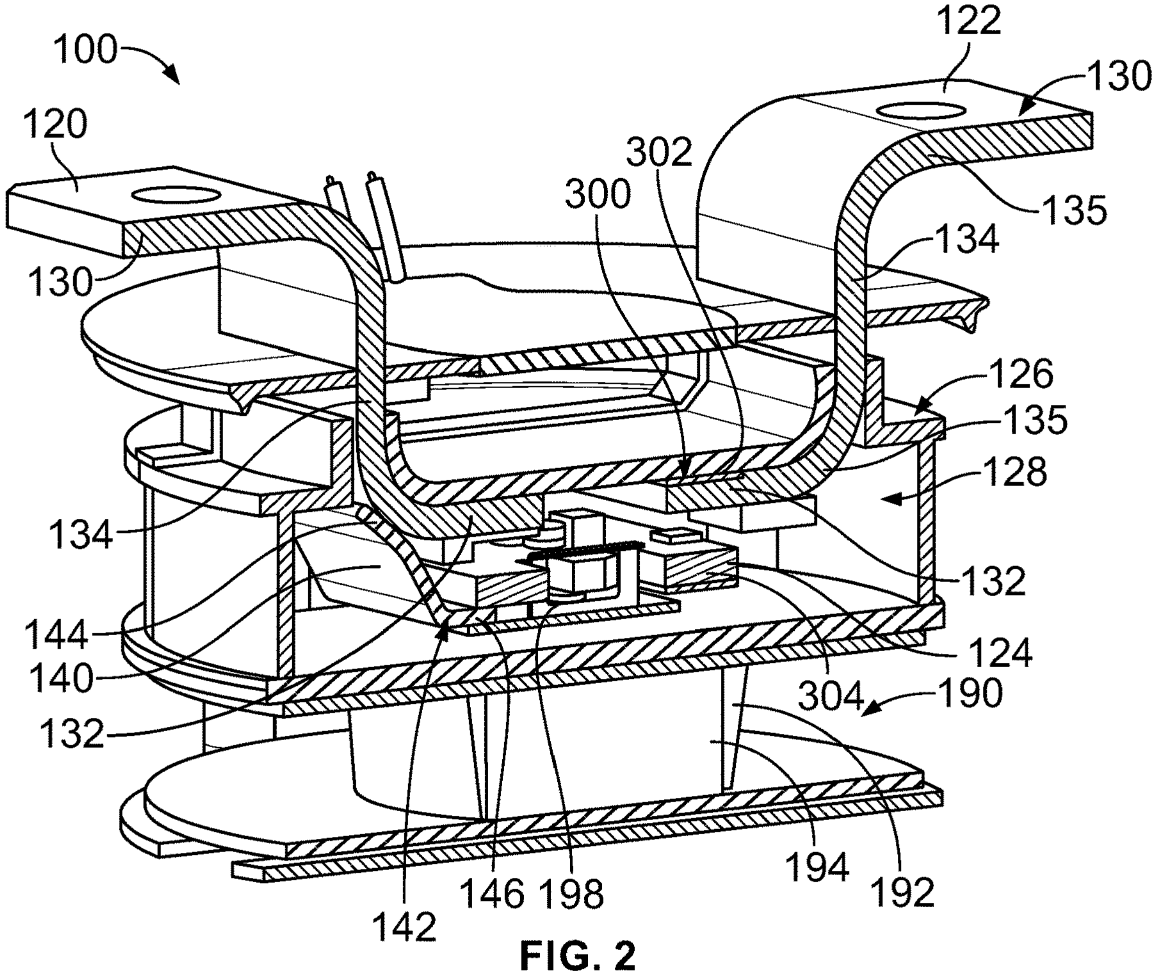
FIG. 2 is a sectional view of the contactor in accordance with an exemplary embodiment.

FIG. 1 illustrates a contactor 100 in accordance with an exemplary embodiment. FIG. 2 is a sectional view of the contactor 100 in accordance with an exemplary embodiment illustrating internal components of the contactor 100. The contactor 100 is an electrical switch or relay that safely connects and disconnects one or more electrical circuits to protect the flow of power through the system. The contactor 100 may be used in various applications such as HVAC, power supply, locomotives, elevator control, motor control, aerospace applications, hybrid electric vehicles, fuel-cell vehicles, charging systems, and the like.

The contactor 100 includes a housing 110 (removed in FIG. 2 to illustrate the internal components of the contactor 100) having an outer wall 111 surrounding a cavity 112. The housing 110 may be a multi-piece housing in various embodiments. The housing 110 includes a base 114 and a header 116 extending from the base 114. Optionally, the base 114 may be configured to be coupled to another component. For example, the base 114 may include mounting brackets for securing the contactor 100 to the other component. In the illustrated embodiment, the base 114 is provided at a bottom of the contactor 100 and the header 116 is located above the base 114; however, the housing 110 may have other orientations in alternative embodiments. The housing 110 includes a cover 118 (FIG. 1) for closing the cavity 112. For example, the cover 118 may be coupled to the top of the header 116. Optionally, the cover 118 may be sealed to the header 116. The outer wall 111 along the header 116 may be cylindrical defining a cylindrical cavity 112 in various embodiments. The cavity 112 may be at least partially filled with epoxy for sealing the housing 110 and internal components.

The contactor 100 includes first and second fixed contacts 120, 122, 122 received in the cavity 112 and a movable contact 124 movable within the cavity 112 between a mated position and an unmated position. The movable contact 124 electrically connects the fixed contacts 120, 122 in the mated position. The fixed contacts 120, 122 are fixed to the housing 110. For example, the fixed contacts 120, 122 may be coupled to the header 116 and/or the cover 118. In an exemplary embodiment, a contact holder 126 is used to hold the fixed contacts 120, 122. The contact holder 126 is received in the cavity 112 and coupled to the housing 110. The contact holder 126 may be removable from the cavity 112 when the cover 118 is removed from the header 116. The contact holder 126 defines an enclosure 128. The fixed contacts 120, 122 extend into the enclosure 128. The movable contact 124 is located in the enclosure 128. The outer wall 111 surrounds the enclosure 128.

The fixed contacts 120, 122 each include an outer end defining a terminating end 130 and an inner end defining a mating end 132. In various embodiments, the fixed contacts 120, 122 each have a transition portion 134 with one or more bends 135. In the illustrated embodiment, the fixed contacts 120, 122 are S-shaped having the terminating end 130 parallel to the mating end 132. Other shapes are possible in alternative embodiments. For example, the fixed contacts 120, 122 may be planar without any bends. The terminating end 130 is configured to be terminated to another component, such as a wire or a terminal, such as a line in or a line out wire. In an exemplary embodiment, the terminating end 130 is exposed at the exterior of the contactor 100 for terminating to the other component. The terminating end 130 may be threaded to receive a nut. In the illustrated embodiment, the terminating end 130 extends through the cover 118 and is located above the cover 118. The mating end 132 is located within the cavity 112 for connection with the movable contact 124, such as when the contactor 100 is energized. In the illustrated embodiment, the mating end 132 is generally flat or planar, such as for engaging the movable contact 124. However, the mating end 132 may have other shapes in alternative embodiments. In other various embodiments, the terminating ends 130 may be located inside the housing 110. For example, the wires may extend into the housing 110 for termination to the terminating ends 130.

In an exemplary embodiment, the contactor 100 includes a flexible busbar 140 electrically connecting the first fixed contact 120 and the movable contact 124. The flexible busbar 140 flexes as the movable contact 124 moves between the mated position and the unmated position. In an exemplary embodiment, the flexible busbar 140 includes a flexible braid 142 having braided conductors. A first mating end 144 of the flexible busbar 140 is connected to the first fixed contact 120. A second mating end 146 of the flexible busbar 140 is connected to the movable contact 124. The first and second mating ends 144, 146 may be welded to the first fixed contact 120 and the movable contact 124, respectively. The movable contact 124 remains connected to the first fixed contact 120 through the flexible busbar 140 as the movable contact 124 moves between the mated position and the unmated position. However, in alternative embodiments, the contactor 100 may be provided without the flexible busbar 140. Rather, the movable contact 124 may be movable toward and away from the first fixed contact 120 to mate and unmate from the first fixed contact 120 in a similar manner as the second fixed contact 122.

The contactor 100 includes a coil assembly 190 in the cavity 112 operated to move the movable contact 124 between the unmated position and the mated position. The coil assembly 190 includes a winding or coil 192 wound around a core 194 to form an electromagnetic field. The coil assembly 190 includes a plunger (not shown) coupled to the core 194. The movable contact 124 is coupled to the plunger and is movable with the plunger when the coil assembly 190 is operated. When the electromagnetic field is generated, the plunger is driven in the mating direction. The mating force may be controlled based on the strength of the electromagnetic field. The coil assembly 190 includes a spring 198 for returning the movable contact 124 to the unmated position when the coil assembly 190 is deenergized. Optionally, the contactor 100 may include an arc suppressor (not shown) for suppressing electrical arc of the electrical circuit. The arc suppressor may be located in the cavity 112 of the housing 110. In an exemplary embodiment, the arc suppressor includes magnets creating magnetic fields in the enclosure 128 for suppressing arc created between the movable contact 124 and the fixed contacts 120, 122. In an exemplary embodiment, the contact holder 126 may be sealed, such as using epoxy, and may be filled with an inert gas for arc suppression.

In an exemplary embodiment, the contactor 100 includes a magnetic shroud 300 that provides a magnetic holding force to hold the movable contact 124 in the mated position. The magnetic holding force provides additional holding force in addition to the holding force provided by the energized coil assembly 190. The magnetic holding force is an attractive force used to overcome repulsive forces between the movable contact 124 and the second fixed contact 122, such as repulsive Holms forces induced by the current flow through the contacts 122, 124. The magnetic shroud 300 is coupled to the second fixed contact 122 and/or the movable contact 124. For example, an upper shroud 302 may be coupled to the second fixed contact 122 and a lower shroud 304 may be coupled to the movable contact 124. The upper shroud 302 is configured to be magnetically coupled to the lower shroud 304, such as when the current flows through the contacts 122, 124 to create a magnetic field for the shrouds 302, 304. An attractive force is generated between the shrouds 302, 304 to help hold the movable contact 124 in the mated position with the second fixed contact 122.

Figure 3:
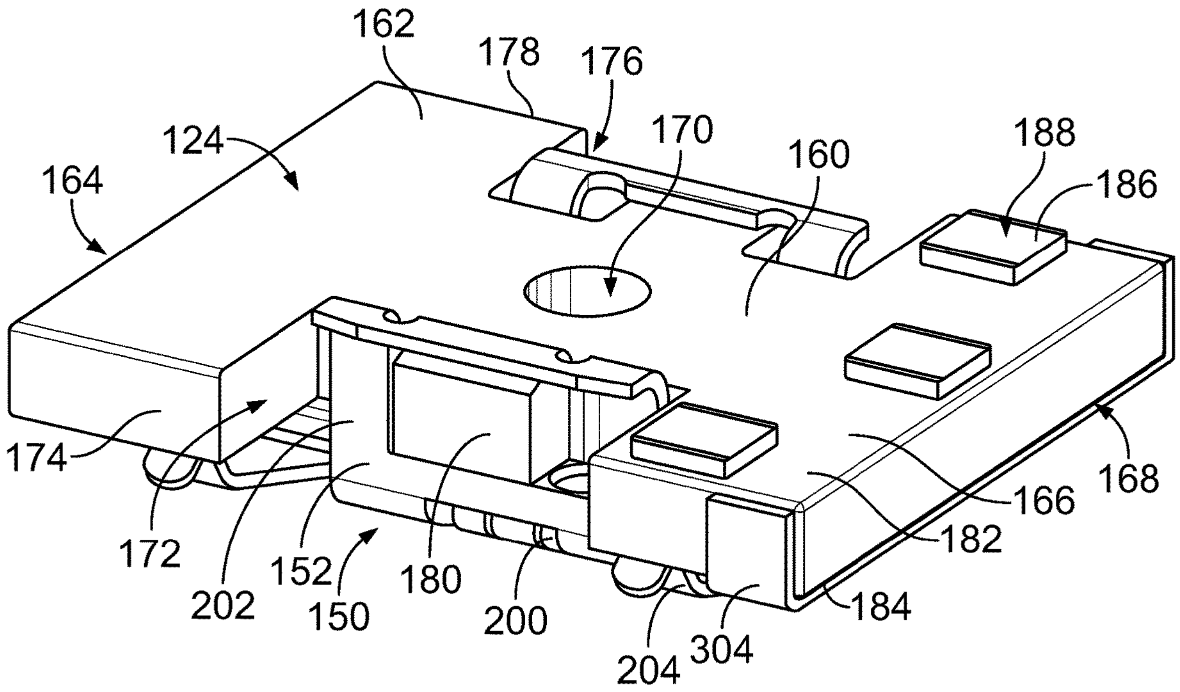
FIG. 3 is a top perspective view of a movable contact assembly in accordance with an exemplary embodiment.

FIG. 3 is a top perspective view of a movable contact assembly 150 in accordance with an exemplary embodiment. The movable contact assembly 150 includes the movable contact 124 and a movable contact holder 152. The movable contact assembly 150 may include the flexible busbar 140 (shown in FIG. 2). The movable contact holder 152 is used to position the movable contact 124 in the housing 110 of the contactor 100 (shown in FIG. 2). For example, the movable contact holder 152 may hold the movable contact 124 in a planar orientation, such as a horizontal orientation, as the movable contact 124 moves within the housing 110. In an exemplary embodiment, the lower shroud 304 is coupled to the movable contact 124 and/or the movable contact holder 152. The lower shroud 304 is movable with the movable contact 124 and/or the movable contact holder 152.

The movable contact 124 is manufactured from a conductive material, such as a metal material. The movable contact 124 may be stamped or cut into a predetermined size and shape, which may affect the amount of current passing through the movable contact 124 and the amount of electrical resistance for the current transferred through the movable contact 124. The movable contact 124 includes a main body 160 having a first plate 162 at a first end 164 of the movable contact 124 and a second plate 166 at a second end 168 of the movable contact 124. The movable contact 124 include an opening 170 in the main body 160. The opening 170 may be coupled to the coil assembly 190 (shown in FIG. 2), such as the plunger.

In the illustrated embodiment, the movable contact 124 is I-shaped, wherein the movable contact 124 is wider (between the sides 174, 178) at the first and second plates 162, 166 and narrower along the central portion of the main body 160. The movable contact 124 includes a first pocket 172 along a first side 174 of the movable contact 124 and a second pocket 176 along a second side 178 of the movable contact 124. The plates 162, 166 provide greater surface area for mating with the flexible busbar 140 and the second fixed contact 122 (shown in FIG. 2). The movable contact 124 may have other shapes in alternative embodiments, such as a rectangular shape having a constant width. The movable contact 124 includes mounting tabs 180 extending into the pockets 172, 176. The movable contact holder 152 is coupled to the mounting tabs 180 at the first and second sides 174, 178. The lower shroud 304 may be received in the first and second pockets 172, 176 and coupled to the mounting tabs 180.

The movable contact 124 includes an upper surface 182 and a lower surface 184. In an exemplary embodiment, the lower shroud 304 extends along the lower surface 184. The lower shroud 304 may be aligned with the opening 170. In an exemplary embodiment, the flexible busbar 140 is configured to be coupled to the lower surface 184 of the first plate 162 at the first end 164. However, the flexible busbar 140 may be coupled to the upper surface 182 in alternative embodiments.

In an exemplary embodiment, the movable contact 124 includes mating contact pads 186 at the upper surface 182 along the second plate 166 at the second end 168. The mating contact pads 186 are configured to be mated to and unmated from the second fixed contact 122. Each mating contact pad 186 includes a mating interface 188 forming the point of contact with the second fixed contact 122. Electrical paths are created between the movable contact 124 and the second fixed contact 122 through the mating contact pads 186. In the illustrated embodiment, the mating interfaces 188 are generally planar. However, the mating contact pads 186 may have other shapes in alternative embodiments, such as being bumps having a convex shape. In an exemplary embodiment, the movable contact 124 includes three of the mating contact pads 186 arranged in a triangular orientation. Greater or fewer mating contact pads 186 may be provided in alternative embodiments. The mating contact pads 186 may be arranged in a different orientation in alternative embodiments. In an exemplary embodiment, the mating contact pads 186 may be located adjacent the perimeter of the movable contact 124, such as at the first and second sides 174, 178 and at the second end 168, such as to increase the spacing between the mating contact pads 186.

In an exemplary embodiment, the movable contact holder 152 is a stamped and formed part. The movable contact holder 152 may be coupled to the coil assembly 190, such as the plunger, to position the movable contact 124 as the movable contact 124 is moved between the mated position and the unmated position.

The movable contact holder 152 includes a base 200, mounting arms 202 extending from the base 200, and support arms 204 extending from the base 200. The lower shroud 304 may be located between the base 200 of the movable contact holder 152 and the lower surface 184 of the movable contact 124. The mounting arms 202 are used to secure the movable contact holder 152 to the movable contact 124. The mounting arms 202 are secured to the mounting tabs 180 at the first and second sides 174, 178 of the movable contact 124. The support arms 204 are used to position the movable contact 124 within the housing 110 of the contactor 100 (shown in FIG. 2) during mating and unmating. The support arms 204 engage the lower surface 184 of the movable contact 124 to press upward against the lower surface 184.

Figure 4:
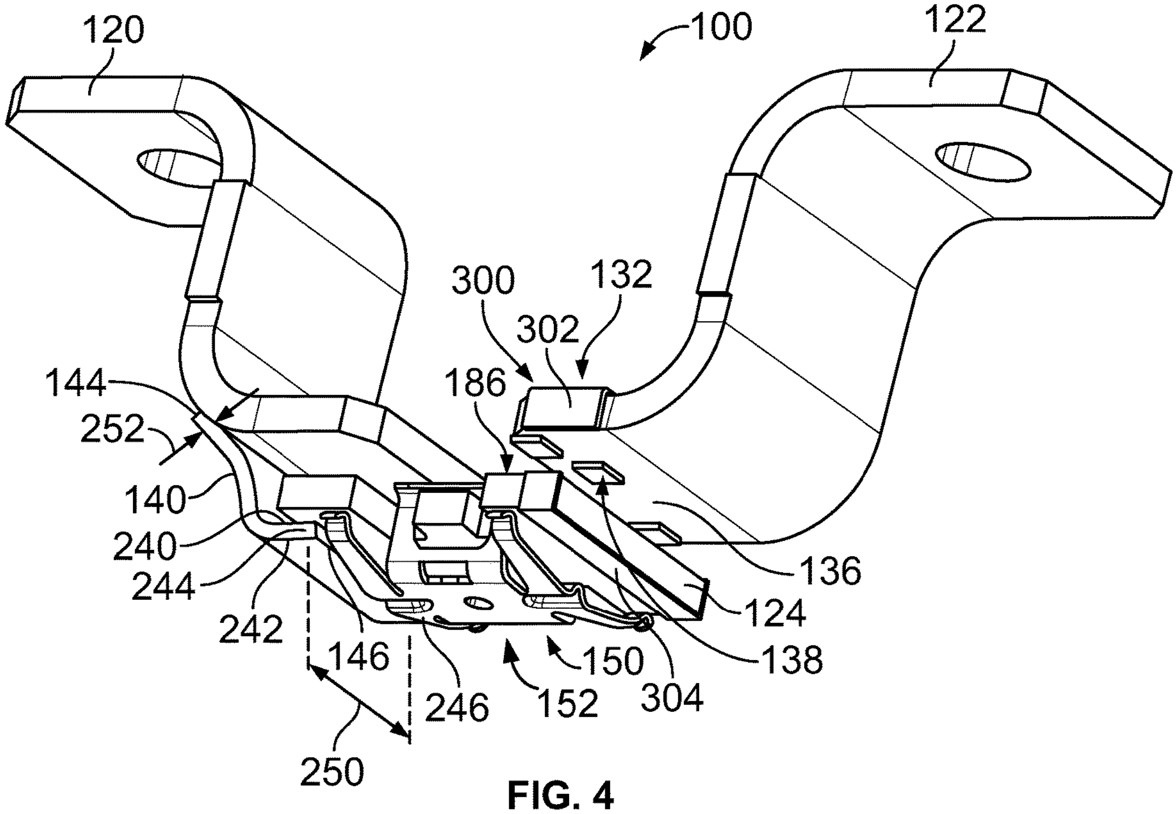
FIG. 4 is a bottom perspective view of a portion of the contactor showing the movable contact assembly in an unmated position relative to the fixed contacts in accordance with an exemplary embodiment.

FIG. 4 is a bottom perspective view of a portion of the contactor 100 showing the movable contact assembly 150 in an unmated position relative to the fixed contacts 120, 122. FIG. 4 illustrates the flexible busbar 140 between the first fixed contact 120 and the movable contact 124. The movable contact 124 is unmated from the second fixed contact 122. FIG. 4 illustrates the upper and lower shrouds 302, 304 coupled to the second fixed contact 122 and the movable contact 124.

In an exemplary embodiment, the second fixed contact 122 includes a mating tab 136 at the mating end 132. The upper shroud 302 is coupled to the mating tab 136. The mating tab 136 is oriented parallel to the movable contact 124. For example, the mating tab 136 may be oriented horizontally. The second fixed contact 122 includes one or more mating tab pads 138 at a bottom of the mating tab 136. The mating tab pads 138 are configured to be mated to and unmated from the mating contact pads 186 of the movable contact 124. Each mating tab pad 138 includes a mating interface forming the point of contact with the corresponding mating contact pad 186.

Electrical paths are created between the movable contact 124 and the second fixed contact 122 through the mating contact pads 186 and the mating tab pads 138. Current flows through the movable contact 124 and the second fixed contact 122 when mated. The current generates a magnetic field. The magnetic shroud 300 generates a magnetically attractive force between the upper and lower shrouds 302, 304 when the magnetic field is generated to hold the movable contact 124 in the mated position. The magnetic holding force overcomes the repulsive forces, such as any repulsive Holms forces generated by the current flowing through the movable contact 124 and the second fixed contact 122, to reduce the risk of undesirable separation between the contacts 122, 124.

In an exemplary embodiment, the mating contact pads 186 and mating tab pads 138 creates multiple points of contact and multiple electrical paths through the second fixed contact 122 and the movable contact 124. For example, parallel electrical paths may be created, such as a first electrical path through the second fixed contact 122 and a second electrical path through the movable contact 124. The parallel electrical paths may generate a magnetically attractive force, which tends to hold the movable contact 124 in the mated position and may reduce the risk of undesirable separation or vibrations in the contacts. In the illustrated embodiment, the mating interfaces are generally planar. However, the mating tab pads 138 may have other shapes in alternative embodiments, such as being bumps having a convex shape.

In an exemplary embodiment, the second fixed contact 122 includes three of the mating tab pads 138 arranged in a triangular orientation. Greater or fewer mating tab pads 138 may be provided in alternative embodiments. The mating tab pads 138 may be arranged in a different orientation in alternative embodiments. In an exemplary embodiment, the mating tab pads 138 may be located adjacent the edges of the second fixed contact 122, such as at the opposite sides and at the end, such as to increase the spacing between the mating tab pads 138.

When the movable contact 124 is in the unmated position, the movable contact pads 186 are spaced apart from the mating tab pads 138. The movable contact pads 186 and the mating tab pads 138 define a separable interface between the movable contact 124 and the second fixed contact 122. However, the movable contact 124 remains electrically connected to the first fixed contact 120 through the flexible busbar 140. The flexible busbar 140 forms a permanent connection between the movable contact 124 and the first fixed contact 120. The flexible busbar 140 is connected to the movable contact 124 and the first fixed contact 120 in the mated position and the flexible busbar 140 is connected to the movable contact 124 and the first fixed contact 120 in the unmated position.

In an exemplary embodiment, the flexible busbar 140 has a generally rectangular cross-section. For example, the flexible busbar 140 is plate-like or sheet-like having an upper surface 240 and a lower surface 242 extending between first and second sides 244, 246. The sides 244, 246 extend between the first and second mating ends 144, 146. The flexible busbar 140 has a length between the mating ends 144, 146 and a width 250 between the sides 244, 246. Optionally, the width 250 may be approximately equal to the length. The flexible busbar 140 has a thickness 252 between the upper surface 240 and the lower surface 242. In an exemplary embodiment, the flexible busbar 140 is wide and thin. For example, the width 250 may be at least ten times the thickness 252. As such, the flexible busbar 140 is configured to move and bend as the movable contact 124 is moved between the mated position and the unmated position. The shape of the flexible busbar 140 changes as the movable contact 124 is moved between the mated position and the unmated position.

Figure 5:
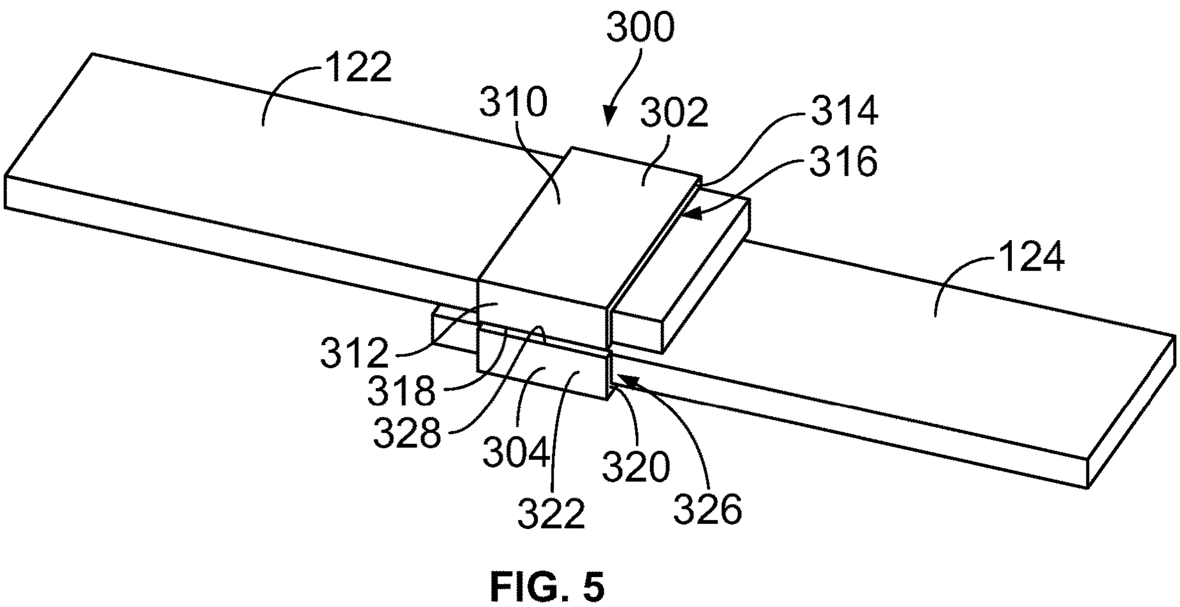
FIG. 5 is a schematic view of a portion of the contactor showing the movable contact in a mated position relative to the second fixed contact in accordance with an exemplary embodiment.
Figure 6:
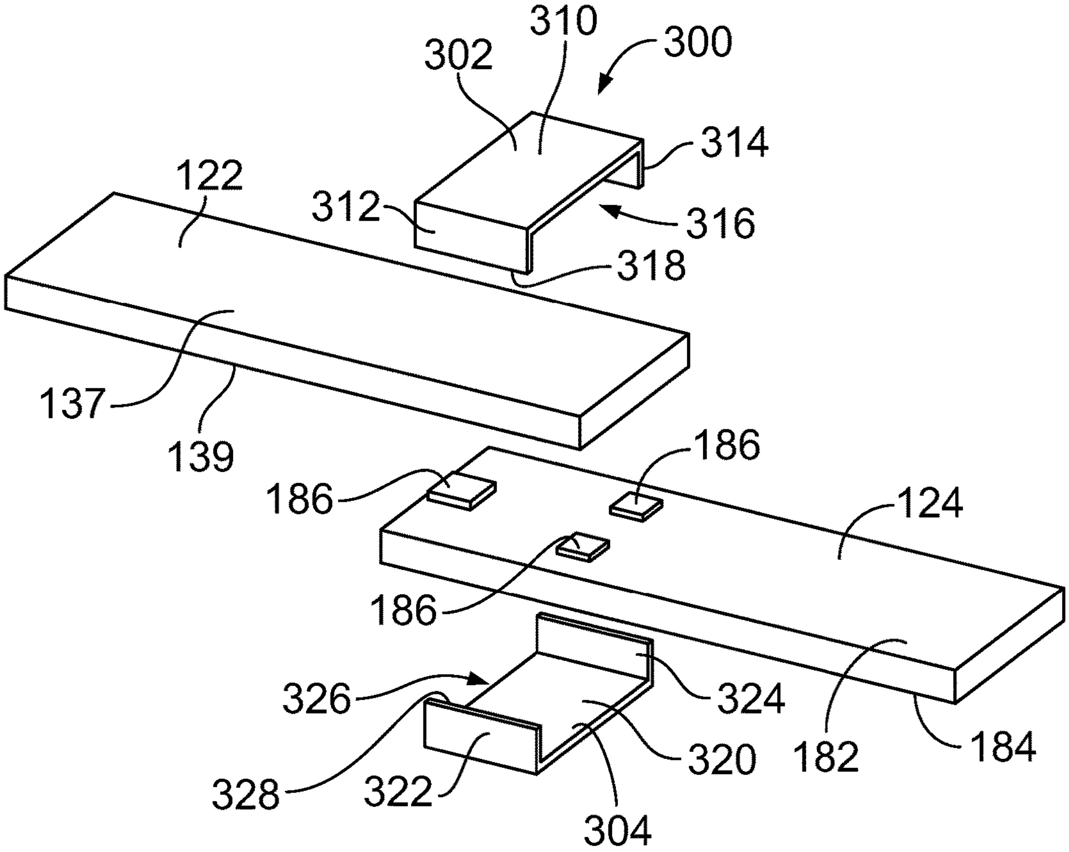
FIG. 6 is an exploded schematic view of a portion of the contactor showing the movable contact and the second fixed contact in accordance with an exemplary embodiment.

FIG. 5 is a schematic view of a portion of the contactor 100 showing the movable contact 124 in a mated position relative to the second fixed contact 122. FIG. 6 is an exploded schematic view of a portion of the contactor 100 showing the movable contact 124 and the second fixed contact 122. FIGS. 5 and 6 show the movable contact 124 and the second fixed contact 122 as planar, rectangular contacts; however, the movable contact 124 and the second fixed contact 122 may have other shapes, such as the shapes illustrated in FIG. 4. FIGS. 5 and 6 illustrate the upper and lower shrouds 302, 304 for magnetically coupling the second fixed contact 122 and the movable contact 124.

The second fixed contact 122 includes an upper surface 137 and a lower surface 139. The movable contact 124 includes the upper surface 182 and the lower surface 184. The lower surface 139 of the second fixed contact 122 faces the upper surface 182 of the movable contact 124. The mating tab pads 138 (shown in FIG. 4) are at the lower surface 139 and face the movable contact pads 186 at the upper surface 182. In the mated position, the mating tab pads 138 are connected to the movable contact pads 186 to create electrical paths between the second fixed contact 122 and the movable contact 124. Current flows through the second fixed contact 122 and the movable contact 124 in the mated position. When current passes through the interface, a repulsive Holms force is generated at the interface. The Holms forces increase as the current increases, tending to cause the second fixed contact 122 and the movable contact 124 to separate. The magnetic shroud 300 is provided to overcome the repulsive Holms forces and prevent the second fixed contact 122 and the movable contact 124 from unintentionally opening. For example, the magnetic shroud 300 uses the magnetic field generated by the current flow through the second fixed contact 122 and the movable contact 124 to hold the second fixed contact 122 and the movable contact 124 in the closed or mated position when current is flowing through the circuit. The attractive magnetic forces may be proportional to the current. For example, as the current increases, the attractive magnetic force also increases.

The magnetic shroud 300 includes the upper shroud 302 and the lower shroud 304. The upper shroud 302 is coupled to the second fixed contact 122 and a lower shroud 304 is coupled to the movable contact 124. In the illustrated embodiment, the upper shroud 302 is cup-shaped to receive the second fixed contact 122. For example, the upper shroud 302 may be U-shaped. The upper shroud 302 extends along the sides of the second fixed contact 122 and along the upper surface 137 of the second fixed contact 122. In the illustrated embodiment, the lower shroud 304 is cup-shaped to receive the movable contact 124. For example, the lower shroud 304 may be U-shaped. The lower shroud 304 extends along the sides of the movable contact 124 and along the lower surface 184 of the movable contact 124.

In an exemplary embodiment, the upper shroud 302 includes an upper wall 310, a first upper sidewall 312, and a second upper sidewall 314. The upper sidewalls 312, 314 extend from the bottom of the upper wall 310 to form an upper cavity 316 below the upper wall 310 and between the upper sidewalls 312, 314. The upper cavity 316 receives the second fixed contact 122. The upper cavity 316 may be open at the front and rear to allow the second fixed contact 122 to extend forward and rearward from the upper shroud 302. However, in other embodiments, a front wall may be provided between the sidewalls 312, 314, such as to engage the end of the second fixed contact 122. The upper sidewalls 312, 314 extend to upper edges 318 at the distal ends of the upper sidewalls 312, 314. The upper edges 318 face the lower shroud 304. In the illustrated embodiment, the upper cavity 316 is open between the upper edges 318. The second fixed contact 122 may be loaded into the upper cavity 316 through the open bottom of the upper shroud 302. However, in alternative embodiments, the upper shroud 302 may be enclosed. For example, a lower wall may extend across the bottom to form a rectangular upper shroud, which may receive the end of the second fixed contact 122, such as through openings at the front and rear of the upper shroud 302.

In an exemplary embodiment, the lower shroud 304 includes a lower wall 320, a first lower sidewall 322, and a second lower sidewall 324. The lower sidewalls 322, 324 extend from the top of the lower wall 320 to form a lower cavity 326 above the lower wall 320 and between the lower sidewalls 322, 324. The lower cavity 326 receives the movable contact 124. The lower cavity 326 may be open at the front and rear to allow the movable contact 124 to extend forward and rearward from the lower shroud 304. However, in other embodiments, a front wall may be provided between the sidewalls 322, 324, such as to engage the end of the movable contact 124. The lower sidewalls 322, 324 extend to lower edges 328 at the distal ends of the lower sidewalls 322, 324. The lower edges 328 face the upper shroud 302. In the illustrated embodiment, the lower cavity 326 is open between the lower edges 328. The movable contact 124 may be loaded into the lower cavity 326 through the open top of the lower shroud 304. However, in alternative embodiments, the lower shroud 304 may be enclosed. For example, an upper wall may extend across the top to form a rectangular lower shroud, which may receive the end of the movable contact 124, such as through openings at the front and rear of the lower shroud 304.

Figure 7:
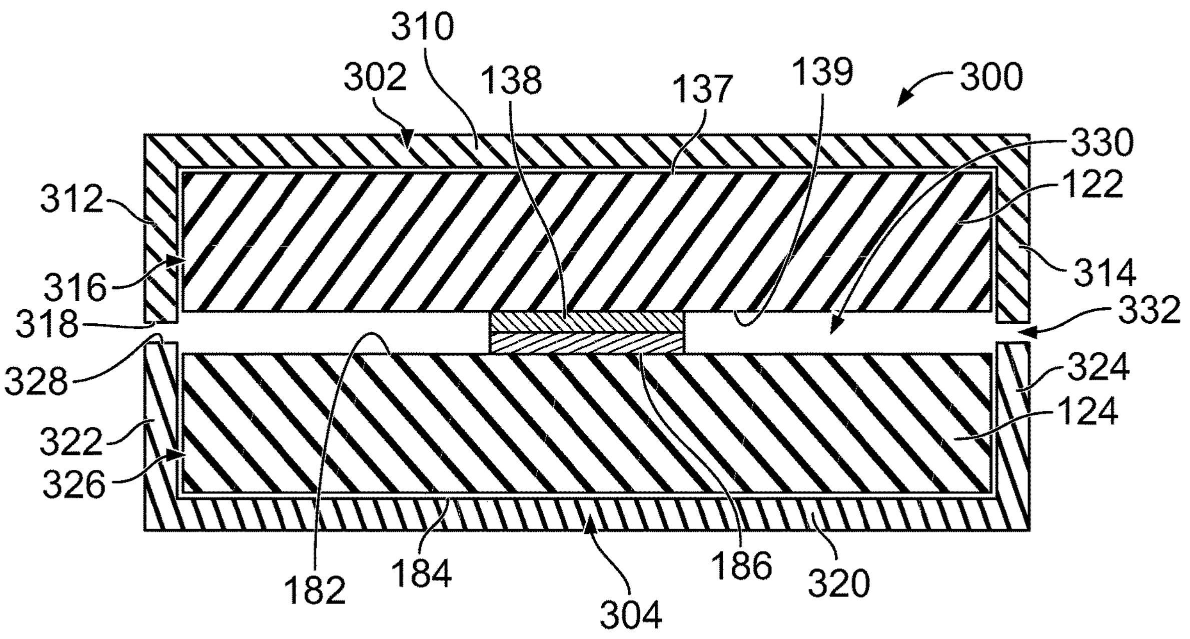
FIG. 7 is a cross sectional view of a portion of the contactor showing the movable contact in a mated position relative to the second fixed contact in accordance with an exemplary embodiment.

FIG. 7 is a cross sectional view of a portion of the contactor 100 showing the movable contact 124 in a mated position relative to the second fixed contact 122. FIG. 7 illustrates the upper and lower shrouds 302, 304 magnetically coupling the second fixed contact 122 and the movable contact 124. The magnetic shroud 300 includes a core 330, such as defined by the upper cavity 316 and the lower cavity 326. The magnetic shroud 300 forms a magnetic field around the core 330. The second fixed contact 122 and the movable contact 124 are located in the core 330 and held in the mated position by the magnetic attractive forces of the upper and lower shrouds 302, 304.

When mated, the mating tab pad(s) 138 at the lower surface 139 of the second fixed contact 122 engages the movable contact pad(s) 186 at the upper surface 182 of the movable contact 124. Electrical paths are created between the second fixed contact 122 and the movable contact 124 through the pads 138, 186 to allow current to flow through the second fixed contact 122 and the movable contact 124. The magnetic shroud 300 is provided to overcome the repulsive Holms forces and prevent the second fixed contact 122 and the movable contact 124 from unintentionally opening. The magnetic field generated by the current flowing through the second fixed contact 122 and the movable contact 124 generates attractive magnetic forces between the upper and lower shrouds 302, 304, which increases as the current through the circuit increases.

The upper shroud 302 is coupled to the second fixed contact 122 and extends along the sides of the second fixed contact 122 and along the upper surface 137 of the second fixed contact 122. The upper shroud 302 may be coupled to the second fixed contact 122 using fasteners, clips, epoxy or other securing elements. Alternatively, the upper shroud 302 may be coupled to the second fixed contact 122 by an interference fit. The lower shroud 304 is coupled to the movable contact 124 and extends along the sides of the movable contact 124 and along the lower surface 184 of the movable contact 124. The lower shroud 304 may be coupled to the movable contact 124 using fasteners, clips, epoxy or other securing elements. Alternatively, the lower shroud 304 may be coupled to the movable contact 124 by an interference fit. The upper edges 318 of the upper shroud 302 faces the lower edges 328 of the lower shroud 304 across a gap 332. The upper shroud 302 is magnetically attracted to the lower shroud 304 across the gap 332.

The magnetic attractive force is proportional to the current passing through the circuit (for example, passing between the second fixed contact 122 and the movable contact 124). The magnetic attractive force may be controlled (for example, increased/decreased) by changing the current flowing through the circuit. The magnetic attractive force may be controlled by selecting the material of the upper shroud 302 and/or the lower shroud 304. In various embodiments, the upper and lower shrouds 302, 304 may be manufactured from the same material. For example, the upper and lower shrouds 302, 304 may be manufactured from a low carbon iron material, steel, or other ferrous material. The magnetic attractive force may be controlled by controlling the size (for example, length, width, height, thickness, and the like) of the upper and lower shrouds 302, 304. The magnetic attractive force may be controlled by controlling the spacing between the upper and lower shrouds 302, 304, such as the size of the gap 332 and/or the heights of the sidewalls 312, 314, 324, 326 and/or the spacing between the upper wall 310 and the lower wall 320.

Figure 8:
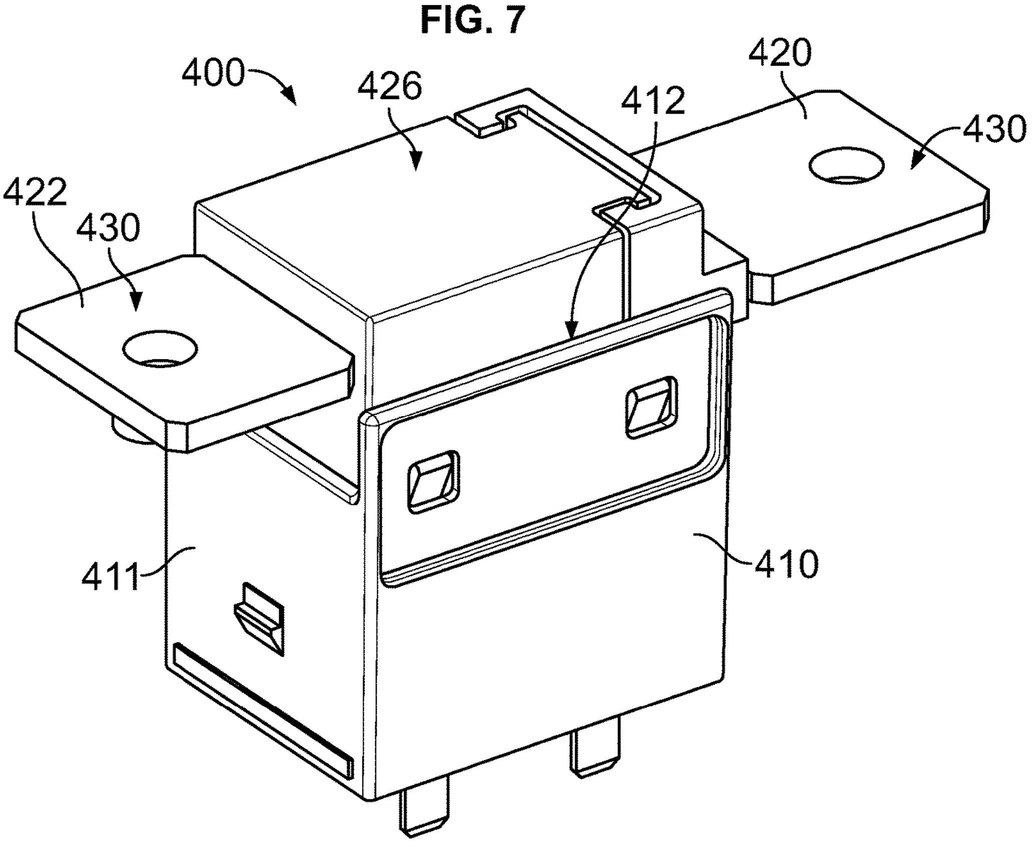
FIG. 8 illustrates a contactor in accordance with an exemplary embodiment.
Figure 9:
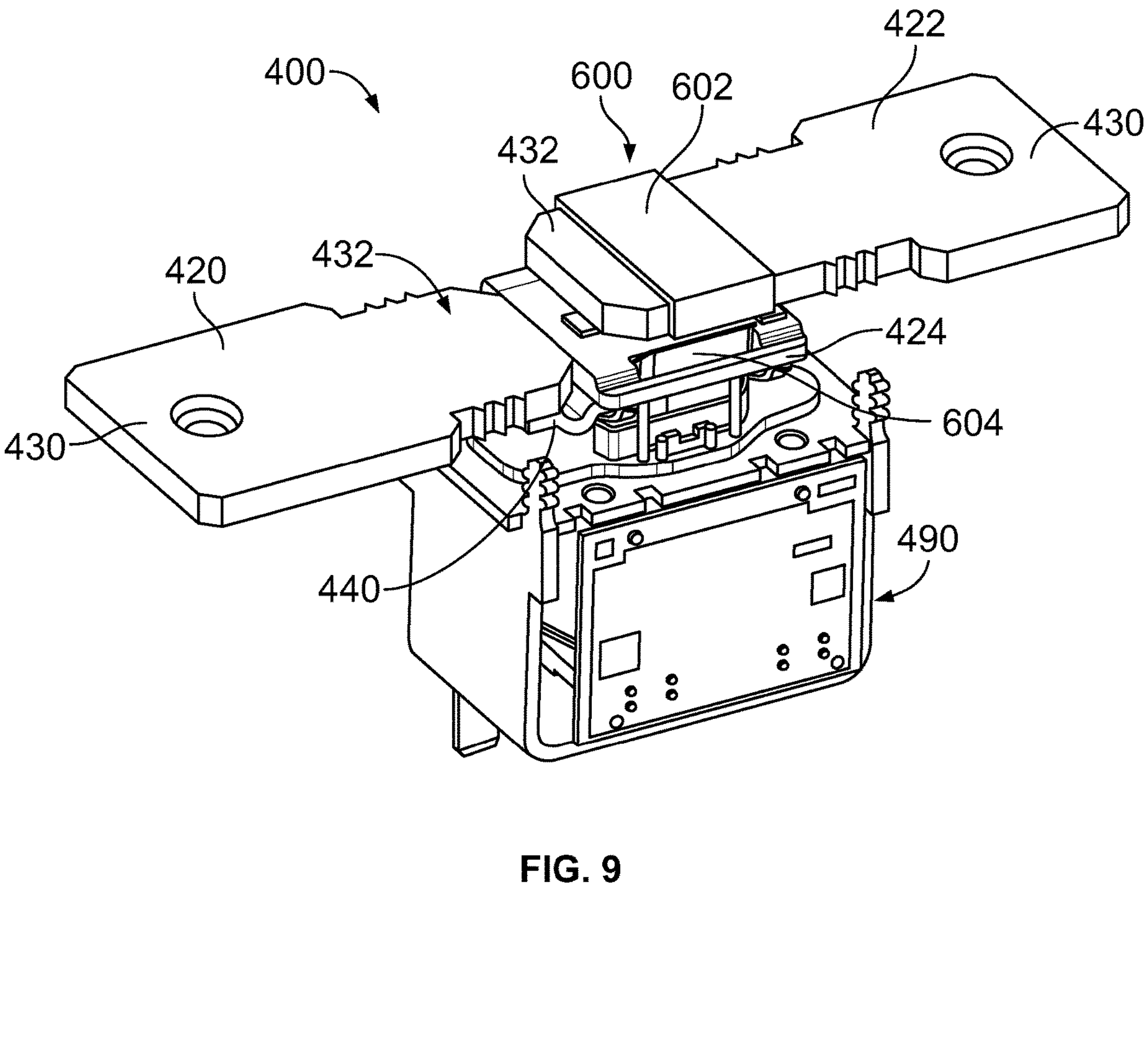
FIG. 9 is a simplified view of the contactor in accordance with an exemplary embodiment illustrating internal components of the contactor.

FIG. 8 illustrates a contactor 400 in accordance with an exemplary embodiment. FIG. 9 is a simplified view of the contactor 400 in accordance with an exemplary embodiment illustrating internal components of the contactor 400. The contactor 400 is similar to the contactor 100; however, the contactor 400 is shaped differently and includes contacts that are shaped differently. The contactor 400 includes a magnetic shroud 600 (FIG. 9) used to magnetically hold the contacts in mated positions when the contactor is energized. The contactor 400 may be an electrical switch or relay.

The contactor 400 includes a housing 410 (removed in FIG. 10 to illustrate the internal components of the contactor 400) having an outer wall 411 surrounding a cavity 412. The housing 410 may be a multi-piece housing in various embodiments. The outer wall 411 may have a rectangular cross-section in various embodiments.

The contactor 400 includes first and second fixed contacts 420, 422, 422 received in the cavity 412 and a movable contact 424 movable within the cavity 412 between a mated position and an unmated position. The movable contact 424 electrically connects the fixed contacts 420, 422 in the mated position. The fixed contacts 420, 422 are fixed to the housing 410. In an exemplary embodiment, a contact holder 426 is used to hold the fixed contacts 420, 422. The contact holder 426 is received in the cavity 412 and coupled to the housing 410.

The fixed contacts 420, 422 each include an outer end defining a terminating end 430 and an inner end defining a mating end 432. In the illustrated embodiment, the fixed contacts 420, 422 are generally planar and may be oriented parallel to each other. Other shapes are possible in alternative embodiments. The terminating end 430 is configured to be terminated to another component, such as a wire or a terminal, such as a line in or a line out wire. In an exemplary embodiment, the terminating end 430 is exposed at the exterior of the contactor 400 for terminating to the other component. In the illustrated embodiment, the terminating end 430 extends to the exterior of the contact holder 426. The mating end 432 is located within the cavity 412 for connection with the movable contact 424. In the illustrated embodiment, the mating end 432 is located inside the contact holder 426.

In an exemplary embodiment, the contactor 400 includes a flexible busbar 440 electrically connecting the first fixed contact 420 and the movable contact 424. The flexible busbar 440 flexes as the movable contact 424 moves between the mated position and the unmated position. The movable contact 424 remains connected to the first fixed contact 420 through the flexible busbar 440 as the movable contact 424 moves between the mated position and the unmated position. However, the contactor 400 may be provided without the flexible busbar 440 in alternative embodiments. In such embodiments, the movable contact 424 may separate from both the first and second fixed contacts 420, 422.

The contactor 400 includes a coil assembly 490 in the cavity 412 operated to move the movable contact 424 between the unmated position and the mated position. The coil assembly 490 is energized to move the movable contact 424 to the mated position. For example, the coil assembly 490 forms an electromagnetic field to move the movable contact 424. When mated, current is able to flow through the fixed contacts 420, 422 through the flexible busbar 440 and the movable contact 424. The current generates repulsive Holms forces between the second fixed contact 422 and the movable contact 424. The current also generates a magnetic field used by the magnetic shroud 600 to overcome the repulsive forces. In an exemplary embodiment, the magnetic shroud 600 provides a magnetic holding force to hold the movable contact 424 in the mated position. The magnetic holding force provides additional holding force in addition to the holding force provided by the energized coil assembly 490. The magnetic holding force is an attractive force used to overcome repulsive forces between the movable contact 424 and the second fixed contact 422, such as repulsive Holms forces induced by the current flow through the contacts 422, 424. In an exemplary embodiment, the magnetic shroud 600 includes an upper shroud 602 coupled to the second fixed contact 422 and a lower shroud 604 may be coupled to the movable contact 424. The upper shroud 602 is configured to be magnetically coupled to the lower shroud 604 when the current flows through the contacts 422, 424 to create a magnetic field for the shrouds 602, 604. An attractive force is generated between the shrouds 602, 604 to help hold the movable contact 424 in the mated position with the second fixed contact 422.

Figure 10:
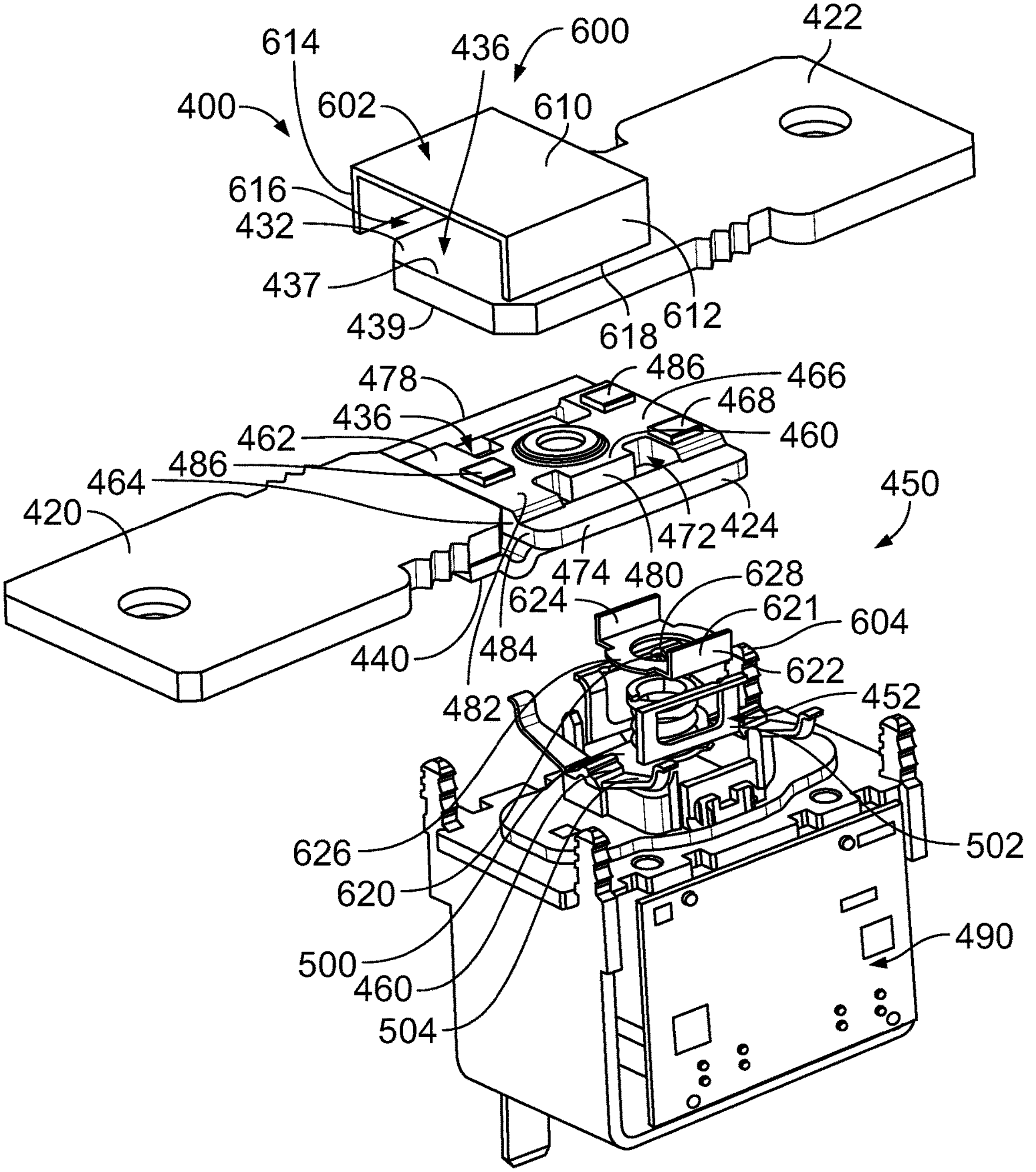
FIG. 10 is an exploded view of the contactor in accordance with an exemplary embodiment illustrating internal components of the contactor.
Figure 11:
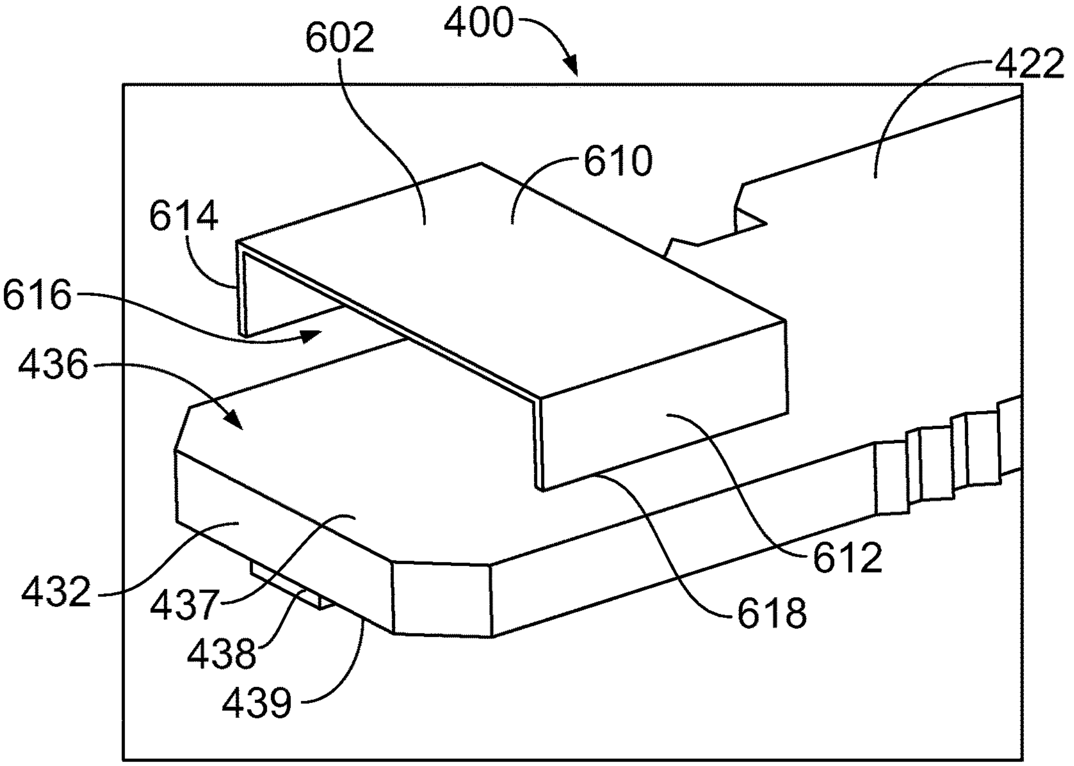
FIG. 11 is an enlarged view of a portion of the contactor showing the second fixed contact and the upper shroud in accordance with an exemplary embodiment.
Figure 12:
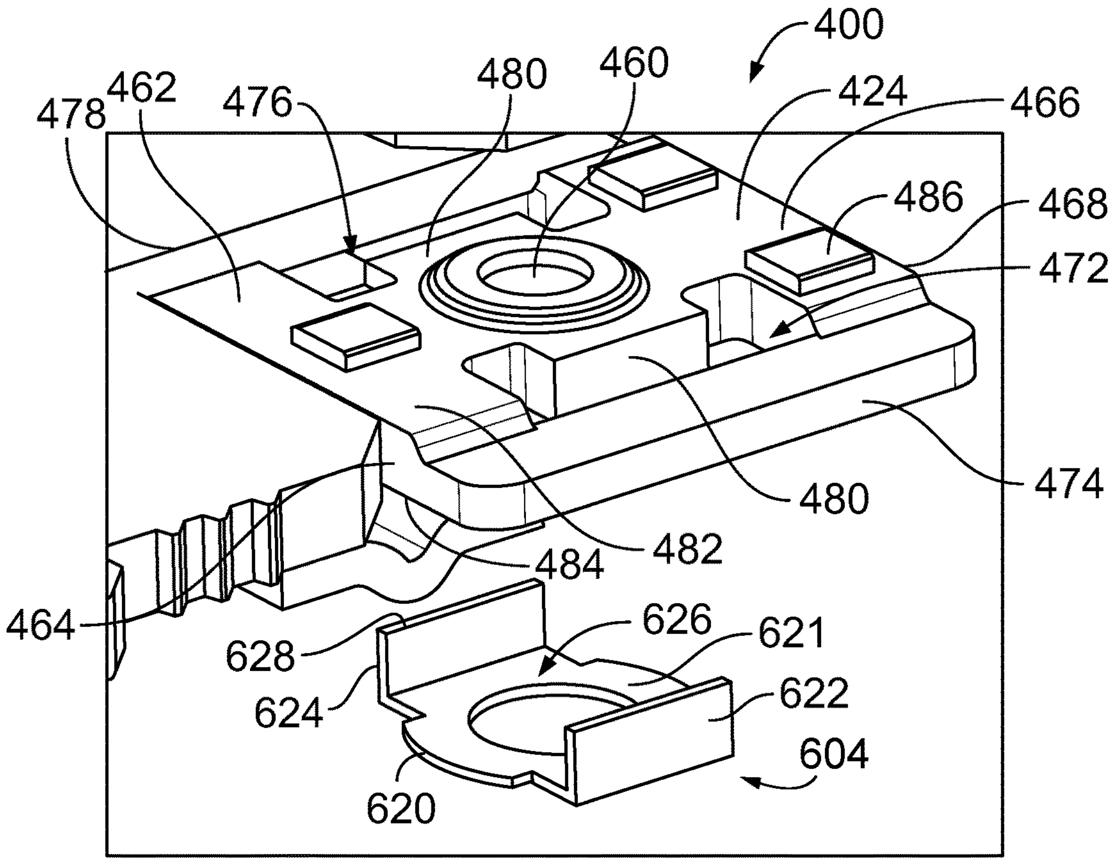
FIG. 12 is an enlarged view of a portion of the contactor showing the movable contact and the lower shroud in accordance with an exemplary embodiment.

FIG. 10 is an exploded view of the contactor 400 in accordance with an exemplary embodiment illustrating internal components of the contactor 400. FIG. 11 is an enlarged view of a portion of the contactor 400 showing the second fixed contact 422 and the upper shroud 602 in accordance with an exemplary embodiment. FIG. 12 is an enlarged view of a portion of the contactor 400 showing the movable contact 424 and the lower shroud 604 in accordance with an exemplary embodiment.

The contactor 400 includes a contact assembly including the first and second fixed contacts 420, 422, the movable contact 424, and the flexible busbar 440. FIG. 10 shows the magnetic shroud 600, which is configured to be coupled to the second fixed contact 422 and the movable contact 424 to create an attractive magnetic force to help hold the movable contact 424 in the mated position with the second fixed contact 422, while FIG. 11 shows the upper shroud 602 and FIG. 12 shows the lower shroud 604 of the magnetic shroud 600.

The contactor 400 includes a movable contact assembly 450, which includes the movable contact 424 and a movable contact holder 452. The movable contact holder 452 positions the movable contact 424 in the housing 410 of the contactor 400. In an exemplary embodiment, the lower shroud 604 is coupled to the movable contact 424 and/or the movable contact holder 452. The lower shroud 604 is movable with the movable contact 424 and/or the movable contact holder 452.

The movable contact 424 includes a main body 460 having a first plate 462 at a first end 464 of the movable contact 424 and a second plate 466 at a second end 468 of the movable contact 424. The movable contact 424 includes a first pocket 472 along a first side 474 of the movable contact 424 and a second pocket 476 along a second side 478 of the movable contact 424. The movable contact 424 includes mounting tabs 480 extending into the pockets 472, 476. The movable contact holder 452 is coupled to the mounting tabs 480 at the first and second sides 474, 478. The lower shroud 604 may be received in the first and second pockets 472, 476 and coupled to the mounting tabs 480. The movable contact 424 includes an upper surface 482 and a lower surface 484. In an exemplary embodiment, the lower shroud 604 extends along the lower surface 484. In an exemplary embodiment, the movable contact 424 includes mating contact pads 486 at the upper surface 482 configured to be mated to and unmated from the second fixed contact 422.

In an exemplary embodiment, the movable contact holder 452 is a stamped and formed part. The movable contact holder 452 may be coupled to the coil assembly 490, such as the plunger, to position the movable contact 424 as the movable contact 424 is moved between the mated position and the unmated position. The movable contact holder 452 includes a base 500, mounting arms 502 extending from the base 500, and support arms 504 extending from the base 500. The lower shroud 604 may be located between the base 500 of the movable contact holder 452 and the lower surface 484 of the movable contact 424. The mounting arms 502 are used to secure the movable contact holder 452 to the movable contact 424. The mounting arms 502 are secured to the mounting tabs 480 at the first and second sides 474, 478 of the movable contact 424. The support arms 504 are used to position the movable contact 424 within the housing 410 of the contactor 400 (shown in FIG. 5) during mating and unmating. The support arms 504 engage the lower surface 484 of the movable contact 424 to press upward against the lower surface 484.

In an exemplary embodiment, the second fixed contact 422 includes a mating tab 436 at the mating end 432. The second fixed contact 422 includes an upper surface 437 and a lower surface 439. The upper shroud 602 is coupled to the upper surface 437 at the mating tab 436. The mating tab 436 is oriented parallel to the movable contact 424. For example, the mating tab 436 may be oriented horizontally. The second fixed contact 422 includes one or more mating tab pads 438 (shown in phantom) at a bottom of the mating tab 436. The mating tab pads 438 are configured to be mated to and unmated from the mating contact pads 486 of the movable contact 424. Electrical paths are created between the movable contact 424 and the second fixed contact 422 through the mating contact pads 486 and the mating tab pads 438. Current flows through the movable contact 424 and the second fixed contact 422 when mated. The current generates a magnetic field. The magnetic shroud 600 generates a magnetically attractive force between the upper and lower shrouds 602, 604 when the magnetic field is generated to hold the movable contact 424 in the mated position. The magnetic holding force overcomes the repulsive forces, such as any repulsive Holms forces generated by the current flowing through the movable contact 424 and the second fixed contact 422, to reduce the risk of undesirable separation between the contacts 422, 424.

The magnetic shroud 600 includes the upper shroud 602 (FIG. 11) and the lower shroud 604 (FIG. 12). The upper shroud 602 is coupled to the second fixed contact 422 and the lower shroud 604 is coupled to the movable contact 424. In the illustrated embodiment, the upper shroud 602 is cup-shaped to receive the second fixed contact 422. For example, the upper shroud 602 may be U-shaped. The upper shroud 602 extends along the sides of the second fixed contact 422 and along the upper surface 437 of the second fixed contact 422. In the illustrated embodiment, the lower shroud 604 is cup-shaped to receive the movable contact 424. For example, the lower shroud 604 may be U-shaped. The lower shroud 604 extends along the sides of the movable contact 424 and along the lower surface 484 of the movable contact 424.

In an exemplary embodiment, the upper shroud 602 includes an upper wall 610, a first upper sidewall 612, and a second upper sidewall 614. The upper sidewalls 612, 614 extend from the bottom of the upper wall 610 to form an upper cavity 616 below the upper wall 610 and between the upper sidewalls 612, 614. The upper cavity 616 receives the second fixed contact 422. The upper sidewalls 612, 614 extend to upper edges 618 at the distal ends of the upper sidewalls 612, 614. The upper edges 618 face the lower shroud 604. In the illustrated embodiment, the upper cavity 616 is open between the upper edges 618. The upper shroud 602 is coupled to the second fixed contact 422 and extends along the sides of the second fixed contact 422 and along the upper surface 437 of the second fixed contact 422. The upper shroud 602 may be coupled to the second fixed contact 422 using fasteners, clips, epoxy or other securing elements. Alternatively, the upper shroud 602 may be coupled to the second fixed contact 422 by an interference fit.

In an exemplary embodiment, the lower shroud 604 includes a lower wall 620, a first lower sidewall 622, and a second lower sidewall 624. In the illustrated embodiment, the lower wall 620 includes an opening 621 configured to receive a portion of the coil assembly 490, such as the plunger and/or the spring. The lower sidewalls 622, 624 extend from the top of the lower wall 620 to form a lower cavity 626 above the lower wall 620 and between the lower sidewalls 622, 624. The lower cavity 626 receives the movable contact 424. The lower sidewalls 622, 624 extend to lower edges 628 at the distal ends of the lower sidewalls 622, 624. The lower edges 628 face the upper shroud 602. In the illustrated embodiment, the lower cavity 626 is open between the lower edges 628. The lower shroud 604 is coupled to the movable contact 424 and extends along the sides of the movable contact 424 and along the lower surface 484 of the movable contact 424. The lower shroud 604 may be coupled to the movable contact 424 using fasteners, clips, epoxy or other securing elements. Alternatively, the lower shroud 604 may be coupled to the movable contact 424 by an interference fit.

During operation, the magnetic shroud 600 forms a magnetic field around the contacts 422, 424. The magnetic shroud 600 is provided to overcome the repulsive Holms forces and prevent the second fixed contact 422 and the movable contact 424 from unintentionally opening. The magnetic field generated by the current flowing through the second fixed contact 422 and the movable contact 424 generates attractive magnetic forces between the upper and lower shrouds 602, 604, which increases as the current through the circuit increases. The movable contact 424 is held in the mated position by the magnetic attractive forces of the upper and lower shrouds 602, 604. The upper edges 618 of the upper shroud 602 faces the lower edges 628 of the lower shroud 604 across a gap. The upper shroud 602 is magnetically attracted to the lower shroud 604 across the gap. The magnetic attractive force is proportional to the current passing through the circuit (for example, passing between the second fixed contact 422 and the movable contact 424).

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms “including” and “in which” are used as the plain-English equivalents of the respective terms “comprising” and “wherein.” Moreover, in the following claims, the terms “first,” “second,” and “third,” etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase “means for” followed by a statement of function void of further structure.

What is claimed is:

1. A contactor comprising:

a housing having an outer wall defining a cavity;

a first fixed contact coupled to the housing, the first fixed contact having a first mating end received in the cavity and a first terminating end outside of the housing;

a second fixed contact coupled to the housing, the second fixed contact having a second mating end received in the cavity and a second terminating end outside of the housing;

a movable contact movable within the cavity between a mated position and an unmated position, the movable contact engaging the second mating end in the mated position, the movable contact separated from the second fixed contact in the unmated position;

a flexible busbar coupled to the first mating end and coupled to the movable contact, the flexible busbar electrically connecting the first fixed contact and the movable contact in both the mated position and the unmated position; and a magnetic shroud coupled to at least one of the movable contact and the second fixed contact to provide a magnetic holding force to hold the movable contact relative to the second fixed contact in the mated position.

2. The contactor of claim 1, wherein the magnetic holding force is proportional to a current passing through the movable contact and the second fixed contact.

3. The contactor of claim 1, wherein the magnetic shroud includes a core, the magnetic shroud forming a magnetic field around the core, the second fixed contact and the movable contact being located in the core.

4. The contactor of claim 1, wherein the movable contact includes first mating tabs facing the second fixed contact, the second fixed contact including second mating tabs facing the movable contact and aligned with the first mating tabs, the first mating tabs engaging the second mating tabs when the movable contact is in the mated position.

5. The contactor of claim 1, wherein the flexible busbar includes a flexible braid.

6. The contactor of claim 1, wherein the flexible busbar includes a first mating end coupled to the first fixed contact and a second mating end coupled to the movable contact, the second mating end of the flexible busbar moving with the movable contact relative to the first mating end.

7. The contactor of claim 1, wherein the magnetic shroud includes an upper shroud coupled to the second fixed contact and a lower shroud coupled to the movable contact, the upper shroud being magnetically attracted to the lower shroud.

8. The contactor of claim 7, wherein the lower shroud is movable with the movable contact as the movable contact moves between the mated position and the unmated position.

9. The contactor of claim 7, wherein the upper shroud includes an upper shroud cavity receiving the second fixed contact, the lower shroud including lower shroud cavity receiving the movable contact.

10. The contactor of claim 7, wherein the upper shroud includes an upper wall and an upper side wall extending from the upper wall to form an upper cavity receiving the second fixed contact, the lower shroud including a lower wall and a lower side wall extending from the lower wall to form a lower cavity receiving the movable contact, the upper side wall having an upper edge, the lower side wall having a lower edge facing the upper edge across a gap.

11. The contactor of claim 7, wherein the second fixed contact and the movable contact form an electrical path generating a magnetic field, the magnetic field magnetically attracting the upper shroud to the lower shroud.

12. The contactor of claim 7, wherein the upper shroud includes an open bottom, the second fixed contact received in the upper shroud through the open bottom.

13. The contactor of claim 7, wherein the upper shroud includes a sleeve including a top wall, a bottom wall, and sidewalls between the top wall in the bottom wall, the sleeve forming an upper shroud cavity that receives the second fixed contact, the sleeve surrounding the second fixed contact.

14. The contactor of claim 1, wherein the movable contact includes first mating tabs facing the second fixed contact, the second fixed contact including second mating tabs facing the movable contact and aligned with the first mating tabs, the first mating tabs engaging the second mating tabs when the movable contact is in the mated position, the first mating tabs being repelled from the second mating tabs by repulsive Holms forces, the magnetic holding force being an attractive force greater than the repulsive Holms force.

15. A contactor comprising:

a housing having an outer wall defining a cavity;

a first fixed contact coupled to the housing, the first fixed contact having a first mating end received in the cavity and a first terminating end outside of the housing;

a second fixed contact coupled to the housing, the second fixed contact having a second mating end received in the cavity and a second terminating end outside of the housing;

a movable contact assembly received in the cavity, the movable contact assembly including a flexible busbar, a movable contact, and a movable contact holder, the flexible busbar coupled to the first mating end and coupled to the movable contact, the movable contact held by the movable contact holder, the movable contact holder and the movable contact movable within the cavity between a mated position and an unmated position, the movable contact engaging the second mating end in the mated position, the movable contact separated from the second fixed contact in the unmated position, the flexible busbar electrically connecting the first fixed contact and the movable contact in both the mated position and the unmated position; and a magnetic shroud including an upper shroud coupled to the movable contact and a lower shroud coupled to the second fixed contact, the magnetic shroud includes a magnetic holding force between the upper shroud and the lower shroud to hold the movable contact relative to the second fixed contact in the mated position.

16. The contactor of claim 15, wherein the magnetic shroud includes an upper shroud coupled to the second fixed contact and a lower shroud coupled to the movable contact, the upper shroud being magnetically attracted to the lower shroud, the lower shroud being movable with the movable contact as the movable contact moves between the mated position and the unmated position.

17. The contactor of claim 15, wherein the flexible busbar includes a first mating end coupled to the first fixed contact and a second mating end coupled to the movable contact, the second mating end of the flexible busbar moving with the movable contact relative to the first mating end.

18. The contactor of claim 15, wherein the upper shroud includes an upper shroud cavity receiving the second fixed contact, the lower shroud including lower shroud cavity receiving the movable contact.

19. The contactor of claim 15, wherein the upper shroud includes an upper wall and an upper side wall extending from the upper wall to form an upper cavity receiving the second fixed contact, the lower shroud including a lower wall and a lower side wall extending from the lower wall to form a lower cavity receiving the movable contact, the upper side wall having an upper edge, the lower side wall having a lower edge facing the upper edge across a gap.

20. The contactor of claim 15, wherein the second fixed contact and the movable contact form an electrical path generating a magnetic field, the magnetic field magnetically attracting the upper shroud to the lower shroud.

* * * * *